(12) United States Patent
Riggle

(10) Patent No.: US 12,013,978 B1
(45) Date of Patent: Jun. 18, 2024

(54) APPARATUS AND METHOD FOR INDUCING HEAD MOTION

(71) Applicant: David Riggle, Portland, OR (US)

(72) Inventor: David Riggle, Portland, OR (US)

( * ) Notice: Subject to any disclaimer, the term of this patent is extended or adjusted under 35 U.S.C. 154(b) by 0 days.

(21) Appl. No.: 18/217,275

(22) Filed: Jun. 30, 2023

Related U.S. Application Data

(60) Provisional application No. 63/524,332, filed on Jun. 30, 2023.

(51) Int. Cl.
| | | |
|---|---|---|
| *G06F 3/01* | (2006.01) | |
| *G05D 13/62* | (2006.01) | |
| *G06T 19/00* | (2011.01) | |
| *G06V 20/20* | (2022.01) | |
| *H04N 13/383* | (2018.01) | |

(52) U.S. Cl.
CPC .............. *G06F 3/011* (2013.01); *G06F 3/012* (2013.01); *G06T 19/006* (2013.01); *G06V 20/20* (2022.01); *G05D 13/62* (2013.01); *G06F 3/013* (2013.01); *H04N 13/383* (2018.05)

(58) Field of Classification Search
CPC .......... G06F 3/011; G06F 3/012; G06F 3/013; G06T 19/006; G06V 20/20; G05D 13/62; H04N 13/383
See application file for complete search history.

(56) References Cited

U.S. PATENT DOCUMENTS

| | | | | |
|---|---|---|---|---|
| 9,080,868 B2 * | 7/2015 | Krueger | .................... | G01C 9/10 |
| 9,550,212 B2 * | 1/2017 | Higashino | ............. | G06F 1/1688 |
| 9,984,540 B2 * | 5/2018 | Nahman | .................... | G08B 6/00 |
| 10,124,211 B2 * | 11/2018 | Scholl | ................. | G09B 19/0038 |
| 10,583,358 B1 * | 3/2020 | Garcia | .................... | A63F 13/285 |
| 10,948,514 B2 * | 3/2021 | Nahman | .................... | G08B 6/00 |
| 11,131,856 B2 * | 9/2021 | Gwak | ................. | G02B 27/0176 |
| 11,586,291 B2 * | 2/2023 | Fainstain | .............. | A61B 5/7455 |
| 11,782,480 B1 * | 10/2023 | Hatfield | ................... | G06F 1/163 |
| | | | | 224/576 |
| 11,899,844 B2 * | 2/2024 | Fainstain | ................. | G06F 3/015 |
| 2014/0272915 A1 * | 9/2014 | Higashino | ............. | G06F 1/1688 |
| | | | | 434/365 |
| 2015/0044662 A1 * | 2/2015 | Goto | ........................ | G06F 3/016 |
| | | | | 434/365 |
| 2015/0068052 A1 * | 3/2015 | Krueger | .................... | G01C 9/16 |
| | | | | 33/301 |

(Continued)

*Primary Examiner* — Michael J Jansen, II

(74) *Attorney, Agent, or Firm* — Mohr Intellectual Property Law Solutions, PC

(57) ABSTRACT

A system and method for inducing head motion onto a frame that is secured to the head of a user is provided. A generated counter-rotational reactive force is exerted on the frame to emulate at least one of an apparent movement and an apparent acceleration of an object shown in a visual content portion of presenting media content. One embodiment concurrently operates a first motor to drive a first rotational acceleration of a first rotational acceleration mass based on a determined first acceleration and operates a second motor to drive a second rotational acceleration of a second rotational acceleration mass based on a determined second acceleration, wherein the rotational acceleration of the first rotational acceleration mass and the second rotational acceleration mass cooperatively induces a counter-rotational reactive force on the frame that urges the head of the user.

19 Claims, 9 Drawing Sheets

(56) References Cited

U.S. PATENT DOCUMENTS

| | | | | |
|---|---|---|---|---|
| 2017/0326412 A1* | 11/2017 | Scholl | ............ | A63F 13/24 |
| 2019/0317614 A1* | 10/2019 | Ardouin | ............ | G06F 3/0346 |
| 2020/0356172 A1* | 11/2020 | Fainstain | ............ | G06F 3/015 |
| 2022/0049957 A1* | 2/2022 | Anderson | ............ | H04N 13/332 |
| 2023/0310791 A1* | 10/2023 | Lee | ............ | A61M 21/00 600/27 |

* cited by examiner

APPARATUS AND METHOD FOR INDUCING HEAD MOTION

PRIORITY CLAIM

This application claims priority to copending U.S. Provisional Application, Ser. No. 63/524,332, filed on Jun. 30, 2023, entitled Apparatus and Method For Inducing Head Motion, which is hereby incorporated by reference in its entirety for all purposes.

BACKGROUND OF THE INVENTION

Consumption of content by users is very prevalent in our society. Content may include non-interactive media content (visual and audio content), such as provided by a movie, a television program, or the like. Visual content is presented on a display being viewed by the user, such as their television screen, a video display, or a movie theatre screen. Audio content is reproduced by one or more speakers that emit the associated content sounds that are heard by the consuming user.

More recently, advances in virtual reality (VR) and augmented reality technologies has created various systems and methods for interactive content consumption by a user. Here, the user is able to interact with and/or control the presentation of interactive media content. In some interactive content consumption systems, the user may be wearing a headpiece that includes a display that covers the user's eyes and/or that includes speakers that present the audio portion of the content.

However, visually consuming content may result in an incomplete user experience. The presenting visual content may present visual information that corresponds to motion and/or acceleration that is intended to be visually perceived by the user. For example, the currently presenting visual content may present the viewpoint of the user riding a roller coaster ride, the user jumping from an aircraft, or the user driving a race car, an airplane, a space ship, a boat or another vessel/vehicle.

When the user experiences motion and/or acceleration in real life, the user physically "feels" such actual motion and/or acceleration imparted on to their bodies, as is appreciated by one skilled in the arts. More particularly, the user's head is moved when the user is subjected to acceleration type forces. As is appreciated in the arts of proprioception and kinesthesia, the sensation of joint motion and acceleration, are the sensory feedback mechanisms for motor control and posture. These mechanisms along with the vestibular system, a fluid filled network within the inner ear that can feel the pull of gravity and helps the body keep oriented and balanced, are unconsciously utilized by the brain to provide a constant influx of sensory information.

For example, if the user is in a race car, while looking in a forward direction, the acceleration of the race car will cause the user's head to become tilted in a backwards movement for the duration of the acceleration. If the direction of movement of the vehicle changes, the user's head will be tilted either to the left or to the right. For example, if the race car takes a sharp right hand turn while moving, the user's head will be forced to tilt to the left.

Visual content will often present motion and/or acceleration visual effects that are intended to give the user a feeling of experiencing these motion and/or acceleration sensations while consuming the currently presenting visual content. However, there is no induced movement of the user's head, and in particular to their motion sensing organs in their inner ear, to complement the content's motion and/or acceleration visual effects. This absence of head motion of the user while consuming visual content creates two important issues.

First, the discrepancy between viewing the presenting content's motion and/or acceleration visual effects while not experiencing any corresponding physical cues from their head movement may cause virtual motion sickness (interchangeably referred to in the arts as simulation motion sickness, virtual reality motion sickness, and/or digital motion sickness). Virtual motion sickness causes symptoms that are similar to motion sickness symptoms. The most common virtual motion sickness symptoms are general discomfort, eye strain, headache, stomach awareness, nausea, vomiting, pallor, sweating, fatigue, drowsiness, disorientation, and apathy. Other symptoms include postural instability and retching. Common causes of virtual motion sickness include presenting visual content at low frame rate, at a input lag, and/or by a vergence-accommodation-conflict. Virtual reality sickness is different from motion sickness in that it can be caused by the visually-induced perception of self-motion. Real self-motion is not needed. Other types of presenting content may induce simulator sickness, or non-virtual reality simulator sickness, which tends to be characterized by oculomotor disturbances. In contrast, virtual motion sickness tends to be characterized by disorientation.

A second issue caused by an absence of head motion of the user while consuming visual content is a less than satisfactory user experience. That is, viewing motion and/or acceleration visual effects in presenting content, while not having the associated experience of head movement, may result in an unsatisfactory user experience.

Accordingly, in the arts of presenting visual content to a user, there is a need in the arts for improved methods, apparatus, and systems for improving the user's content consumption experience, and/or for reducing or even eliminating virtual motion sickness resulting from visual content consumption.

SUMMARY OF THE INVENTION

Embodiments of the head motion inducing device (HMID) provide a system and method for inducing motion in a user's head based on presentation of visual content to the user, wherein the induced motion corresponds to the content's apparent motion and/or acceleration visual effects. A generated counter-rotational reactive force is exerted on a frame secured to the user's head to emulate at least one of an apparent movement and an apparent acceleration of an object shown in a visual content portion of presenting media content. One embodiment concurrently operates a first motor to drive a first rotational acceleration of a first rotational acceleration mass based on a determined first acceleration and operates a second motor to drive a second rotational acceleration of a second rotational acceleration mass based on a determined second acceleration, wherein the rotational acceleration of the first rotational acceleration mass and the second rotational acceleration mass cooperatively induces a counter-rotational reactive force on the frame that urges the head of the user

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
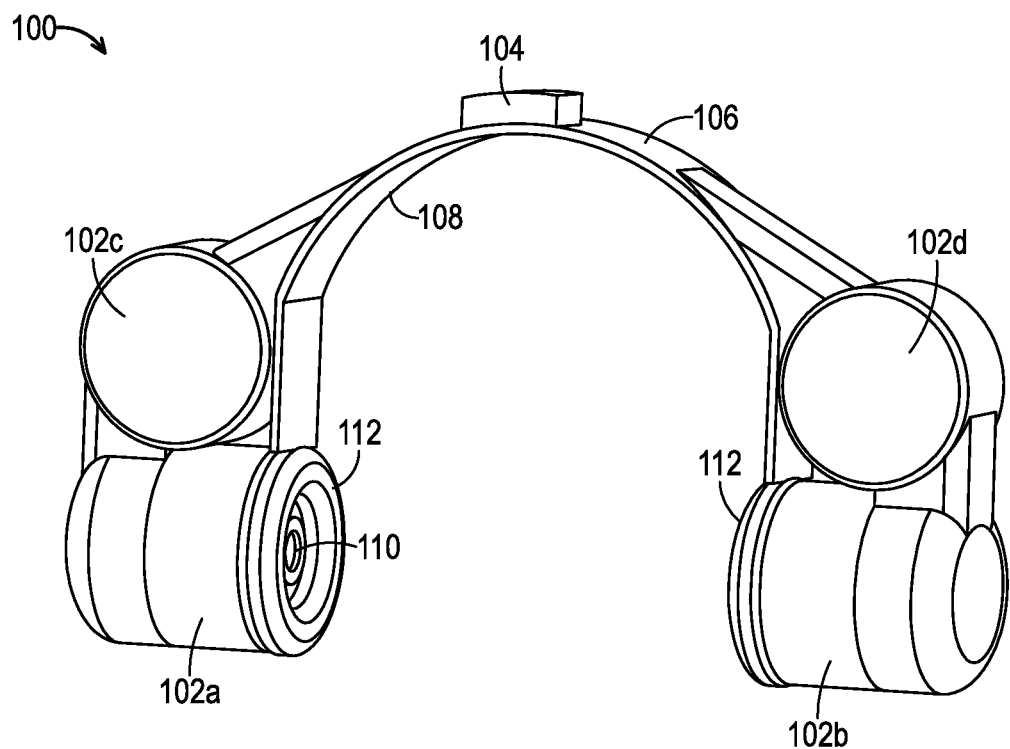
FIG. 1 is a perspective diagram of an example head motion inducing device (HMID).

FIG. 1 is a perspective diagram of an example head motion inducing device (HMID) 100. Embodiments of the HMID 100 comprise a plurality of motor-driven rotational acceleration masses 102a-102d (generically referred herein using reference numeral 102), a HMID controller 104, and a head mounting device 106. The head mounting device 106 is configured to be secured to a user's head while the user is consuming visual content (interchangeably referred to herein as visual media content). For illustration purposes, the nonlimiting example head mounting device 106 is conceptually illustrated as being a generic form of a headphone 106 with the four rotational acceleration masses 102a-102d. Other embodiments may employ other types of structure for the head mounting device 106 and/or different numbers of rotational acceleration masses 102 at different locations.

A headphone 106 embodiment serves a first function of inducing forces on the user's head corresponding to the currently presenting content's motion and/or acceleration visual effects in accordance with the various embodiments. Additionally, the headphone 106 embodiment generates audible sound corresponding to the audio content of the currently presenting audio content. In this example embodiment, a pair of speakers 110 are disposed on the frame 108 so as to be positioned over the ears of the user. A pair of headphone ear pads 112 are disposed on the frame 108 and surround the speakers 110 so that the user can comfortably wear the headphone 106 embodiment while visually consuming the visual content (interchangeably referred to herein as video content) that is being presented on a display (not shown).

Other embodiments may not include speakers 110 as an integrated component of the HMID 100. Additionally, or alternatively, some embodiments of the HMID 100 may include a display device that covers the user's eyes such that the user consumes the visual content on the integrated display. Such embodiments may be generically referred to has virtual reality (VR) head set or augmented reality headsets. All such embodiments of any head mounting device 106 are intended to be included within the scope of this disclosure and to be protected by the accompanying claims.

The rotational acceleration masses 102a-102d that are disposed on the headphone 106 are accelerated in a rotational, coordinated manner by the HMID controller 104 to generate counter-rotational reactive forces that are exerted upon the frame 108 of the head mounting device 106. Counter-rotational reactive forces generated by the rotational acceleration masses 102a-102d when the masses are accelerated in a rational manner, and is well known in the arts, and is not described herein other than to the extent necessary for one skilled in the arts to understand the principles and operation of the various embodiments of the HMID 100.

When the counter-rotational reactive forces are generated, the portions of the frame 108 and/or ear phone pads 110 that are in contact with the user's head then impart a corresponding force on the user's head. These induced forces cause movement of the user's head. One skilled in the art appreciates that the user may resist these induced forces (using their neck and/or other body muscles). However, even if the user resists the induced forces, they will physically experience a simulation of acceleration forces that correspond to the currently presenting visual content.

The disclosed systems and methods for HMID 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a HMID 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein 1006, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network. "Controllably coupled" means that an electronic device controls operation of another electronic device.

Figure 2:
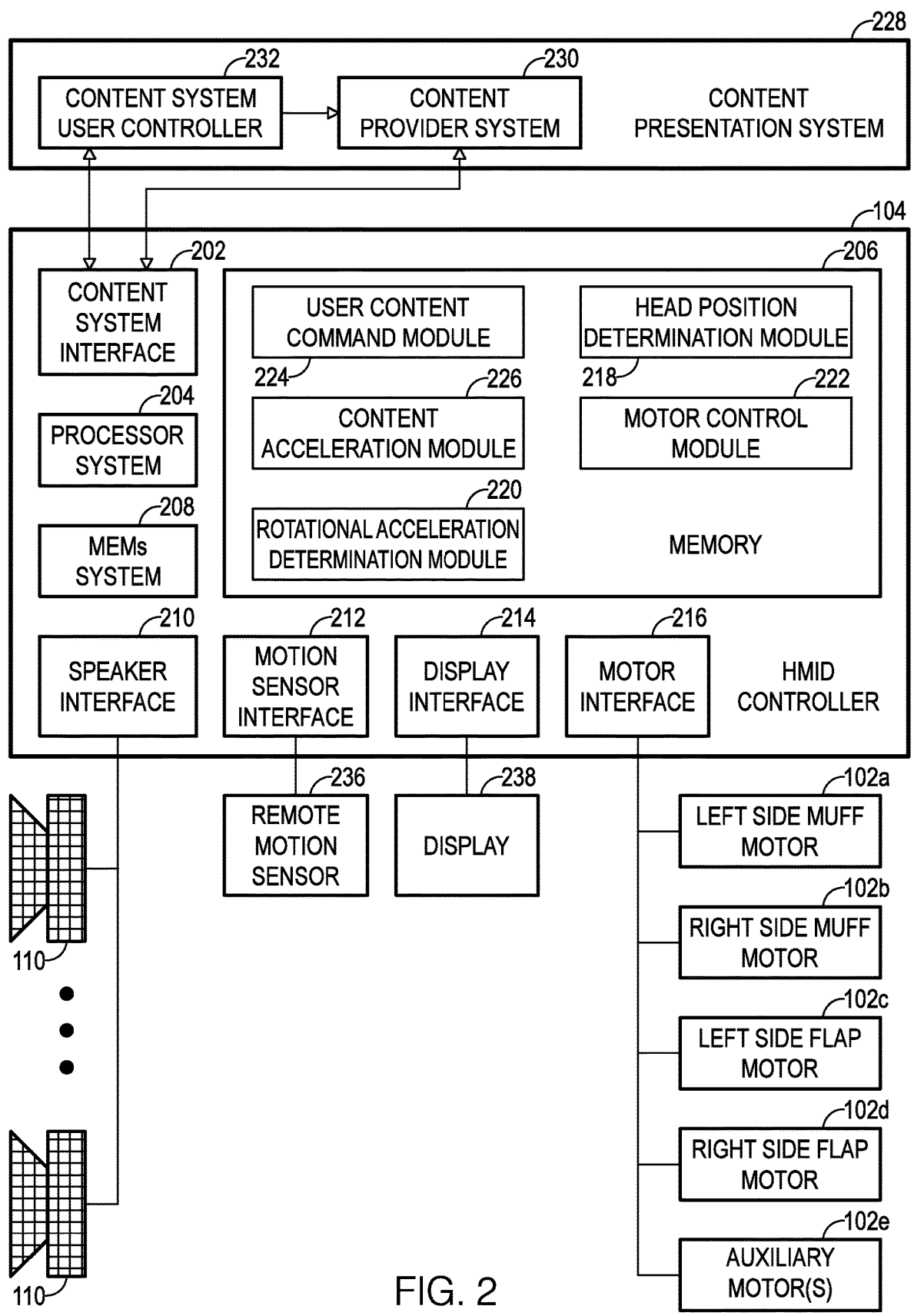
FIG. 2 is a block diagram of selected components of an example HMID.

FIG. 2 is a block diagram of selected components of an example HMID 100. The non-limiting HMID 100 comprises a content system interface 202, a processor system 204, a memory 206, an optional Micro-Electro-Mechanical Systems (MEMs) gyroscope system 208, an optional speaker interface 210, an optional motion sensor interface 212, an optional display interface 214, and a motor interface 216. The memory 206 comprises portions for storing the head position determination module 218, the mass rotation acceleration determination module 220, the motor controller module 222, the user content command module 224, and the content acceleration module 226. In some embodiments, the modules may be integrated together, and/or may be integrated with other logic. In other embodiments, some or all of these memory and other data manipulation functions may be provided by using a remote server or other electronic devices suitably connected via the Internet or otherwise to a client device. Other HMID 100 embodiments may include some, or may omit some, of the above-described processing components. Further, additional components not described herein may be included in alternative embodiments.

In practice, the HMID 100 generates counter-rotational reactive forces that are imparted to the user's head while the user is consuming the visual content that is associated with consumed media content. The generated counter-rotational reactive forces are in synchronism with apparent motion and/or apparent acceleration that is presented in the visual content to the user. Preferably, the user's head moves when subjected to these counter-rotational reactive forces. However, the user may resist the imposed counter-rotational reactive forces using their neck muscles. Either way, the user will experience the sensation of motion and/or acceleration that emulates real life sensation of motion and/or acceleration that corresponds to the currently presenting visual content.

In the various embodiments, information corresponding to the apparent motion and/or apparent acceleration that is presented in the visual content may be provided by a content presentation system 228. Components of the content presentation system 228 are communicatively coupled to the HMID controller 104 via the content system interface 202. The content system interface 202 may be communicatively coupled to the components of the content presentation system 228 using any suitable wire-based or wireless communication median now known or later developed. For brevity, the content presentation system 228 is conceptually described as having a content provider system 230 and an optional content system user controller 232. The content provider system 230 manages generation media content that is communicated to one or more electronic presentation devices that are being used by the user to consume the media content. The media content may include visual content and audio content. Nonlimiting example of the content provider system include interactive gaming system, televisions, movie or home theatres, exercise equipment, or the like.

In some embodiments, the apparent motion and/or apparent acceleration information may be provided by a content system user controller 232 that is being operated by the user during presentation of interactive media content. For example, but not limited to, the content system user controller 232 may be a joystick type of device. For example, the user may be consuming interactive media content where the user is able to control presentation of an avatar that corresponds to the user. If the user pushes forward on their joystick, the content presentation system 228 determines that the user intends to move their avatar in a forward direction. As the user's avatar moves forward, or moves forward in a faster manner, one skilled in the art appreciates that the visual content is presenting apparent motion and/or apparent acceleration information. Accordingly, the HMID 100 generates counter-rotational reactive forces onto the user's head that tends to move or force the user's head in a backward direction, thus emulating the apparent motion and/or apparent acceleration of the avatar.

In some embodiments, the content system user controller 232 provides the user input, interchangeably referred to herein as user intent information, to the content provider system 230. The content provider system 230 manages the presenting visual content in accordance with the received user intent information, as is known in the arts.

In an example embodiment, the content provider system 230 then communicates the user intent information to the HMID controller 104, via the content system interface 202. Based on the received user intent information, the processor system 204 of the HMID controller 104, executing the user content command module 224, interprets the user intent information to determine apparent motion and/or apparent acceleration information corresponding to the apparent motion and/or apparent acceleration that is presented in the visual content. The HMID controller 104 then operates the rotational acceleration masses 102a-102e to generate counter-rotational reactive forces that emulate the apparent motion and/or apparent acceleration that is currently being presented in the visual content.

In other embodiments, the user intent information may be directly communicated from the content system user controller 232 to the HMID controller 104, via the content system interface 202. The user intent information may then be communicated from the HMID controller 104 to the content provider system 230. Alternatively, the user intent information may be concurrently communicated from the content system user controller 232 to the HMID controller 104 and the content provider system 230. Based on the received user intent information, the HMID controller 104, executing the user content command module 224, interprets the user intent information to determine apparent motion and/or apparent acceleration information corresponding to the apparent motion and/or apparent acceleration that is presented in the visual content.

One skilled in the art appreciates that the user intent information can be in any suitable form that corresponds to a control of generated interactive visual content that presents the apparent motion and/or apparent acceleration. The user intent information includes information that corresponds to current speed of the avatar, a change in speed of the avatar (linear acceleration), and/or a change in direction (angular acceleration) of the avatar's movement. All such forms of user intent information now known or later developed are intended to be within the scope of this disclosure and to be protected by the accompanying claims.

Some forms of media content are not user interactive. Accordingly, the content system user controller 232 is not used to generate user intent information. However, the currently presenting visual content being consumed by the user may emulate apparent motion and/or apparent acceleration that is presented in the visual content. Such media content may be provided in movies, television programs, exercise equipment videos, or the like. The visual content is presented on a display or a projection screen that is viewed by the user. Legacy media content may include one or more streams of visual content, one or more streams of audio content, one or more optional closed captioning streams, and one or more optional metadata streams. Future created media content may include apparent motion and/or apparent acceleration information streams that correspond to the apparent motion and/or apparent acceleration that is presented in the visual content. The apparent motion and/or apparent acceleration information is predefined by the content creators and/or providers. This apparent motion and/or apparent acceleration information may be communicated in a separate apparent motion and/or apparent acceleration information stream, in a metadata stream, or the like.

This media content based apparent motion and/or apparent acceleration information (linear acceleration and/or angular acceleration) associated with currently presenting media content is received by the HMID controller 104, via the content system interface 202, from the content provider system 230. Based on the apparent motion and/or apparent acceleration information, the processor system 204 of the HMID controller 104, executing the content acceleration module 226, interprets the apparent motion and/or apparent acceleration information provided by the media content provider to determine apparent motion and/or apparent acceleration information corresponding to the apparent motion and/or apparent acceleration that is presented in the visual content. The HMID controller 104 operates the rotational acceleration masses 102a-102e to generate counter-rotational reactive forces to emulate the apparent motion and/or apparent acceleration that is currently being presented in the visual content.

Some embodiments may be configured to optionally present received audio content. For example, the headphone 106 embodiment may be configured to present the audio portion of received media content. The stream of audio content is communicated from the speaker interface 201 to one or more speakers 110 (see also FIG. 1).

Additionally, or alternatively, some embodiments of the HMID 100 may include, or be communicatively coupled to, a display 234, via the display interface 214. For example, the HMID 100 may be a virtual reality (VR) headset that presents VR media content on the display 234. The VR media content may, in some instances, be interactive such that the user may operate a content system user controller 232 to generate the user intent information.

Alternatively, or additionally, the user may simply turn their head to look at different regions of the presenting video content. The optional MEMs 208 may detect movement of the user's head (since the frame 108 of the HMID 100 is secured to the user's head). Here, an out-of-plane Micro-Electro-Mechanical Systems (MEMs) gyroscope system 208, interchangeably referred to herein as the MEMs 208, may be used to determine angular rotation of the user's head by measuring Coriolis forces exerted on resonating proof masses. Here, the gaze direction (direction of visual viewing of the user) may be determined based on the determined orientation of the user's head.

A nonlimiting example conventional out-of-plane MEMS gyroscope includes two silicon proof masses mechanically coupled to and suspended from a substrate, typically glass, using one or more silicon flexures. A number of recesses etched into the substrate allow selective portions of the silicon structure to move back and forth freely within an interior portion of the device. In certain designs, substrates can be provided above and below the silicon structure to sandwich the proof masses between the two substrates. A pattern of metal traces formed on the substrate(s) can be used to deliver various electrical bias voltages and signal outputs to the device.

A drive system for many MEMS gyroscopes 208 typically includes a number of drive elements that cause the proof mass to oscillate back and forth along a drive axis perpendicular to the direction in which Coriolis forces are sensed. In certain designs, for example, the drive elements may include a number of interdigitated vertical comb fingers configured to convert electrical energy into mechanical energy using electrostatic actuation. Such nonlimiting example drive elements are described, for example, in U.S. Pat. No. 5,025,346 to Tang et al., entitled "LATERALLY DRIVEN RESONANT MICROSTRUCTURES," and U.S. Pat. No. 7,036,373 to Johnson et al., entitled "MEMS GYROSCOPE WITH HORIZONTALLY ORIENTED DRIVE ELECTRODES," both of which are incorporated herein by reference in their entirety. All such embodiments of any HMID 100 that employ a MEMs 208, or include an equivalent motion and acceleration sensing system, or receive information from a remote motion sensor 236, are intended to be included within the scope of this disclosure and to be protected by the accompanying claims.

The remote motion sensor 236 may provide direction and/or orientation information corresponding to the user's head to the HMID controller 104, via the motion sensor interface 212. In some instances, the remote motion sensor 236 may be similarly constructed as the MEMs 208 to detect motion, orientation, and/or acceleration of the user's head. The remote motion sensor 236 may optionally include a processor based system that determines the user's head motion, head orientation, and/or eye orientation. As another nonlimiting example, the user may be wearing a VR head set that includes a remote motion sensor 236, which may be needed to determine orientation of the user's eyes (gaze direction) during game play and/or interactive visual content consumption.

In a preferred embodiment, the head tracking function tracks the movement of the user's head 302 in six degrees of freedom. Multiple tracking systems may be used. Alternative tracking systems include camera based simultaneous localization and mapping (SLAM) tracking may be used in some embodiments. As another non-limiting example, a laser based lighthouse tracking system may be used.

Figure 3:
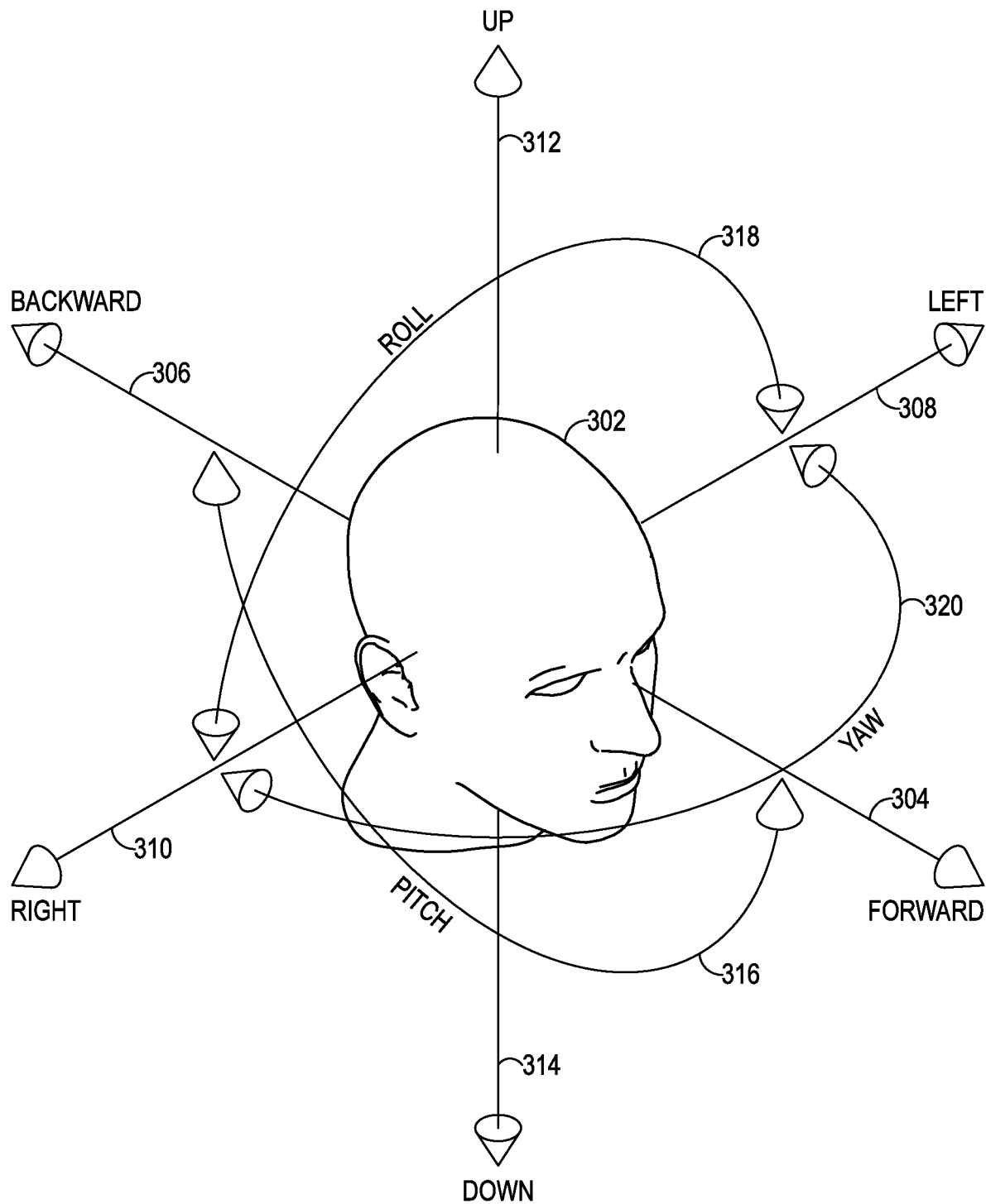
FIG. 3 is a perspective diagram of the user's head with illustrated reference directions.

FIG. 3 is a perspective diagram of the user's head 302 with illustrated reference directions. The forward direction vector 304 corresponds to the direction that the user looks when looking straight forward. The backward direction vector 306 is opposite the forward direction vector 304. The left direction vector 308 is an outward left pointing direction vector that is perpendicular to the forward direction vector 304. The right direction vector 310 is an outward right pointing direction vector that is perpendicular to the forward direction vector 304. The up direction vector 312 is an upward direction vector and the down direction vector 314 is a downward vector. One skilled in the art appreciate that these direction vectors 304, 306, 308, 310, 312, and 314 correspond to the x, y, and x axis coordinate system centered proximate to the centroid of the user's head. The x-y plane, corresponding to the direction vectors 304, 306, 308 and 310, pass between the eyes of the user 302. The y-z plane, corresponding to the direction vectors 308, 310, 312 and 314, pass through the ears of the user 302.

As described in greater detail hereinbelow, these direction vectors 304-314 remain stationary with respect to the current position and orientation of the user's head 302. The direction vectors 304-314 are independent from the orientation of user's body.

One skilled in the art appreciates that the user may tilt their head forward or backward. Such forward or backward tilting of the user's head 302 is referred to as pitch orientation 316. Pitch 316 may be measured in terms of degrees with the forward direction vector 304 representing a zero degree (0°) pitch. The user may tilt their head to the left side or the right side. Such sideward tilting of the user's head 302 is referred to as roll orientation 318. Roll 318 may be measured in terms of degrees with the upward direction vector 312 representing a zero degree (0°) roll. The user may turn their head left or right. Such left or right movement of the user's head 302 is referred to as yaw orientation 316. Pitch 316 may be measured in terms of degrees with the forward direction vector 304 representing a zero degree (0°) pitch.

Returning to FIG. 1, the HMID 100 includes the four rotational acceleration masses 102a-102d. The internal components of the rotational acceleration masses 102a-102d are described in greater detail hereinbelow.

With respect to FIGS. 1 and 3, a first left side rotational acceleration mass 102a is secured on the frame 106 at a location, in this example embodiment, proximate to the left ear of the user's head. The first left side rotational acceleration mass 102a is oriented parallel to a plane that is defined by the forward direction vector 304 and the up direction vector 312. That is, the first left side rotational acceleration mass 102a is aligned parallel to the user's view vector VV (FIGS. 4-6) when the user is wearing the HMID 100.

A first right side rotational acceleration mass 102b is secured on the frame 106 at a location proximate to the right ear of the user's head. The first right side rotational acceleration mass 102b is also oriented parallel to the plane that is also defined by the forward direction vector 304 and the up direction vector 312. That is, the first right side rotational acceleration mass 102b is aligned parallel to the user's view vector VV (FIGS. 4-6) when the user is wearing the HMID 100.

The first left side rotational acceleration mass 102a and the first right side rotational acceleration mass 102b are oriented parallel to each other. Since the first left side rotational acceleration mass 102a and the first right side rotational acceleration mass 102b are located in the example embodiment illustrated in FIG. 1 proximate to the user's ears, much like ear muffs that keep the user's ears warm during cold weather, these masses are interchangeably referred to herein as the left side muff mass 102a and the right side muff mass 102b, respectively.

When the rotational masses of the first left side rotational acceleration mass 102a and the first right side rotational acceleration mass 102b are both rotatably accelerated in the same direction, such as a clockwise direction (depending on a selected orientation viewpoint), the acceleration of the rotating masses of the first left and right side rotational acceleration masses 102a, 102b cooperatively generate a total counter-rotational reactive force that urges the user's head in a downward and forward tilting direction along the forward direction vector 304 (along the pitch axis of FIG. 3). Conversely, when the rotational masses of the first left side rotational acceleration mass 102a and the first right side rotational acceleration mass 102b are both rotatably accelerated in the opposite direction, such as a counterclockwise direction (depending on a selected orientation viewpoint), the acceleration of the rotating masses of the first left and right side rotational acceleration masses 102a, 102b cooperatively generate a total counter-rotational reactive force that urges the user's head in an upward and backward tilting direction.

In instances when the apparent motion and/or apparent acceleration that is presented in the visual content corresponds to a forward linear acceleration, then the first left and right side rotational acceleration masses 102a, 102b may both be rotatably accelerated in the example counterclockwise direction to cooperatively generate the total counter-rotational reactive force that urges the user's head 302 in an upward and forward tilting direction (pitch axis of FIG. 3) to emulate the apparent forward linear acceleration that is being presented in the visual content. One skilled in the art appreciates that this exemplary description of urging the user's head 302 in the upward and forward tilting direction to simulate an apparent forward acceleration shown in visual content presumes that the user's head 302 is oriented in the same direction as the user's body.

Conversely, in instances when the apparent motion and/or apparent acceleration that is presented in the visual content corresponds to a linear deacceleration, then the first left and right side rotational acceleration masses 102a, 102b may both be rotatably accelerated in the example clockwise direction to cooperatively generate a total counter-rotational reactive force that urges the user's head 302 in a downward and backward tilting direction to emulate the apparent linear deacceleration (slowing down and/or stopping) that is being presented in the visual content. One skilled in the art appreciates that this exemplary description of urging the user's head 302 in the downward tilting direction to simulate the deacceleration shown in visual content presumes that the user's head 302 is oriented in the same direction as the user's body.

In instances when the apparent motion and/or apparent acceleration that is presented in the visual content corresponds to a turning movement of the user's head, then the first left and right side rotational acceleration masses 102a, 102b may both be rotatably accelerated in opposite directions to cooperatively generate a total counter-rotational reactive force that urges the user's head 302 in a left turning direction or a right turning direction (along the roll axis of FIG. 3).

With respect to FIGS. 1 and 3, a second left side rotational acceleration mass 102c is secured on the frame 106 at a location, in this example embodiment, proximate to the left ear of the user's head. The second left side rotational acceleration mass 102c is oriented parallel to a plane that is defined by the left direction vector 308 and the up direction vector 312. That is, the second left side rotational acceleration mass 102c is aligned perpendicular to the user's view vector VV (FIGS. 4-6) when the user is wearing the HMID 100.

A second right side rotational acceleration mass 102d is secured on the frame 106 at a location proximate to the right ear of the user's head. The second right side rotational acceleration mass 102d is also oriented parallel to the plane that is defined by the left direction vector 308 and the up direction vector 312. That is, the second right side rotational acceleration mass 102d is aligned perpendicular to the user's view vector VV (FIGS. 4-6) when the user is wearing the HMID 100.

The second left side rotational acceleration mass 102c and the second right side rotational acceleration mass 102d are oriented aligned with and parallel to each other. Since the second left side rotational acceleration mass 102c and the second right side rotational acceleration mass 102d, as located in the example embodiment illustrated in FIG. 1, have an appearance much like side flaps extending outwardly from the user's head 302, these masses are interchangeably referred to herein as the left side flap mass 102c and the right side flap mass 102d, respectively.

When the rotational masses of the second left side rotational acceleration mass 102c and the second right side rotational acceleration mass 102d are both rotatably accelerated in the same direction, such as a clockwise direction (depending on a selected orientation viewpoint), the acceleration of the rotating masses of the second left and right side rotational acceleration masses 102c, 102d cooperatively generate a total counter-rotational reactive force that urges the user's head in a left sideways tilting direction (the roll axis of FIG. 3). Conversely, when the rotational masses of the second left side rotational acceleration mass 102c and the second right side rotational acceleration mass 102d are both rotatably accelerated in the same opposite direction, such as a counterclockwise direction (depending on a selected orientation viewpoint), the acceleration of the rotating masses of the second left and right side rotational acceleration masses 102c, 102d cooperatively generate a total counter-rotational reactive force that urges the user's head in an right sideways tilting direction.

In instances when the apparent motion and/or apparent acceleration that is presented in the visual content corresponds to a left turn or right turn change in direction, then the second left and right side rotational acceleration masses 102c, 102d may both be rotatably accelerated in the example clockwise or counterclockwise direction to cooperatively generate a total counter-rotational reactive force that urges the user's head 302 in either a left or right sidewise tilting direction to emulate the turn's angular acceleration that is being presented in the visual content. One skilled in the art appreciates that this exemplary description of urging the user's head 302 in the sideways tilting direction to simulate a turn's angular acceleration shown in visual content presumes that the user's head 302 is oriented in the same direction as the user's body.

In instances when the apparent motion and/or apparent acceleration that is presented in the visual content corresponds to a an upward or a downward linear movement of the user's body (falling or rising), then the second left and right side rotational acceleration masses 102c, 102d may both be rotatably accelerated in opposite directions to cooperatively generate a total counter-rotational reactive force that urges the user's head 302 downward or upward. Here, the user will perceive a sensation of falling or rising due to the downward or upward forces generated by the second left and right side rotational acceleration masses 102c, 102d.

One skilled in the art appreciates that the rotational acceleration masses 102a-102d may be secured to the frame 106 in other selected locations without departing substantially from the spirit and scope of this disclosure. All such alternative embodiments are intended to be disclosed herein and are intended to be protected by the accompanying claims.

Figure 4:
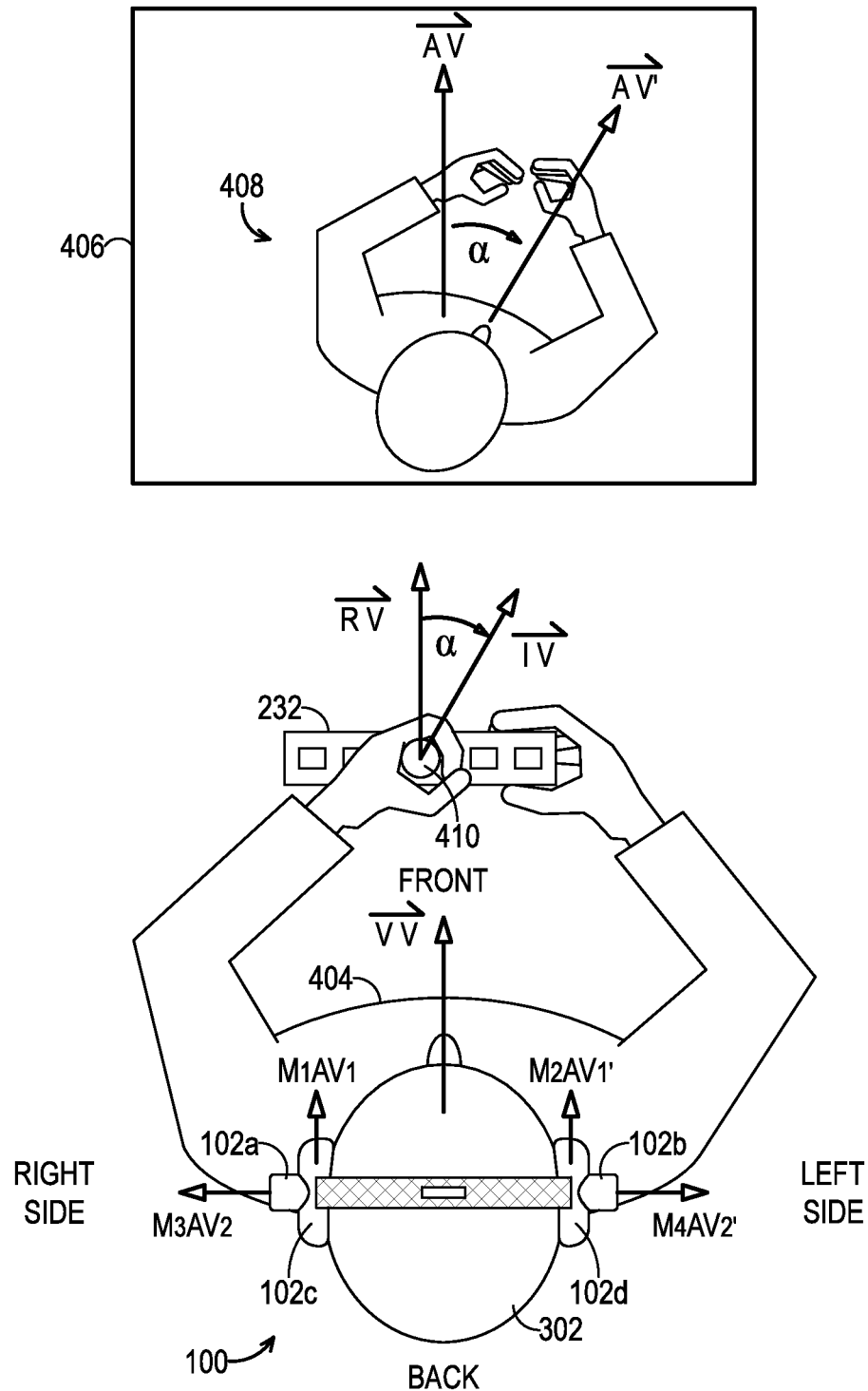
FIG. 4 is a conceptual diagram of the user playing an interactive virtual reality (VR) game.

FIG. 4 is a conceptual diagram of the user playing an interactive virtual reality (VR) game. Here, the presenting visual content is interactive with the user. In this example, the head 302 of the user is looking at visual content being presented on a display 406. Here, the direction of the user's view is represented by the user's view vector VV (corresponding to the pitch axis 304 of FIG. 3). In this simplified example, the body 304 of the user is also illustrated as being aligned with the view vector VV of the user.

The user is conceptually illustrated as consuming visual content being presented on a display 406. The presenting visual content is being managed by the content provider system 230. The visual content includes a field of view that is presented on the display 406. The field of view includes various background objects (not shown) and an avatar 408. The user intuitively understands that they correspond to the avatar 408 in the presenting visual content.

For discussion purposes, assume that the avatar is initially pointing in a forward direction corresponding to the user's view vector VV, conceptually illustrated by the initial avatar vector AV. Here, the user's view vector VV defines the direction of view of the user (that is, where the user is looking).

One skilled in the art appreciates that the various background objects are presented in the appropriate position in the presenting field of view of the visual content so that the viewing user perceives a generated virtual world showing their avatar 408 and the various objects shown in the viewing field.

While consuming the visual content, the user inputs the user intent information to "move" the avatar 408 in a different direction, conceptually illustrated by the intended avatar vector AV'. Here, one skilled in the art appreciates that the user's intent is to move their avatar 408 to the left. Presumably, in this simplified hypothetical example, the avatar 408 is standing still. However, the avatar 408 may be shown as moving through or across the presented field of view (that is, having a velocity component).

The content system user controller 232 is conceptually illustrated as a game controller that employs a joystick 410. To input the user intent information, the user pushes their joystick 410 to the right from the initial reference vector RV to the intended vector IV. The amount of intended turn is conceptually represented by the angle α. The content provider system 230 simulates the redirection of the movement of the avatar 408 to the right by rotating the presenting background object to the left by the angle α. Here, the user perceives that they are turning right as they are viewing the moving objects being presented in the visual content.

Additionally, or alternatively if the user simply pushed the joystick 410 forward, such as when user intends to move their avatar 408 using a faster motion. Pushing the joystick 410 further forward in the direction of intended turn would indicate that the user intent information corresponds to a desired faster movement of the avatar 408 while the avatar 408 is performing the turn. Conversely, the user might pull back on the joystick 410 to slow the movement of the avatar 408.

The content provider system 230 determines the apparent motion and/or apparent acceleration information based on the received user intent information input by the user via the user controller 232. This apparent motion and/or apparent acceleration may be represented as an apparent acceleration vector with a direction component, a linear acceleration component, a linear acceleration duration component, an angular acceleration component, and an angular acceleration duration component. The apparent acceleration vector information defines an initial speed of movement (velocity) of the avatar 408, the change in the direction of movement of the avatar 408 (in accordance with the angle α), and the amount of linear and/or angular acceleration of the avatar 408. The content provider system 230 then determines the amount of movement of the background objects based on the received user intent information, as is known in the arts of gaming control.

Further, when a turn is implemented as represented by the angle α, the turning information includes how fast the turn is implemented in the apparent motion and/or apparent acceleration information (a slow turn vs. a fast turn). The speed of the turning of the avatar 410 is associated with a duration of time. That is, the turning information included in the apparent acceleration vector information includes how far the avatar is to turn (a) and how fast the avatar 410 is to turn (based on a determined angular acceleration duration).

Other avatar motions may also be included (such as jumping up or down, etc.), and these motions may be represented in the apparent motion and/or apparent acceleration information by other accelerations, but are not described herein for brevity.

In some alternative embodiments, the movement information of the joystick (corresponding to the user's intention) can be directly communicated to the HMID controller 104. In these embodiments, the processor system 204, executing the user content command module 224, can compute the same apparent acceleration vector information as the content provider system 230 that is also receiving the joystick information.

Continuing with explanation of the operation of the HMID 100 with respect to the hypothetical game play described above, it is important to note that for the following discussion, the orientation of the user's head 302 is aligned with the initial reference vector RV and the initial avatar vector AV. That is, both the user 302 and the avatar 410 are assumed to be looking in the same forward direction.

In response to receiving (or generating) the apparent acceleration vector information, embodiments of the HMID 100 determine an induced head movement that is to be applied to the head 302 of the user. The HMID 100 determines the magnitude of acceleration, the direction of acceleration, and the duration of acceleration for the rotational acceleration masses 102a-102d based on the received (or determined) apparent acceleration vector information.

Assume, in this first hypothetical example, that the user intends to accelerate their avatar 410 without turning. Here, the user is looking forward, as indicated by the user's view vector VV. Accordingly, there will only be a linear acceleration component associated with the change in speed of movement of the avatar 408. One skilled in the art appreciates that in a real world situation of linear acceleration applied to the user's body, the user's head 302 would tend to be tilted backward by the forces of the acceleration (assuming that the user is looking in the forward direction). The HMID 100 emulates that feeling of linear acceleration by generating forces that tend to move the head 301 to tilt backwards. In this simplified example wherein the user's intent is for linear acceleration only (increase is speed), the first left side rotational acceleration mass 102a and the first right side rotational acceleration mass 102b will be accelerated at a determined rate of speed, a direction of rotation, and for a determined duration. Here, the direction of rotation will be the same. The second left side rotational acceleration mass 102c and the second right side rotational acceleration mass 102d are not accelerated.

Once the amount, direction, and duration of acceleration are determined for the first left side rotational acceleration mass 102a, the processor system 204, executing the motor control module 222, processes the apparent acceleration vector information to determine a motor control signal that is communicated to the motor (motor 1 acceleration vector 1, or M1AV1) of the first left side rotational acceleration mass 102a, via the motor interface 216. The motor interface 216 may be coupled to the motor of the first left side rotational acceleration mass 102a via a wire-based or wireless medium (likewise for the other rotational acceleration masses 102b-102e). Concurrently, the processor system 204 determines a motor control signal that is communicated to the motor (motor 2 acceleration vector 1', or M2AV1') of the first right side rotational acceleration mass 102b, via the motor interface 216. (No signal, or a null signal, is communicated to the motors of the second left side rotational acceleration mass 102c and the second right side rotational acceleration mass 102d.) The as the motors accelerate the masses of the first left side rotational acceleration mass 102a and the first right side rotational acceleration mass 102b, the user then feels the sensation of their head being urged to tilt backwards in response to the forward acceleration of their avatar 408.

Assume, in a second hypothetical example, that that the user intends to turn their avatar 410 without any forward or backward movement (or a change in current speed of the avatar 408). Here, there will only be an angular acceleration associated with the turn. One skilled in the art appreciates that in a real world situation of an angular acceleration applied to the user's body during a turn, the user's head 302 would tend to be tilted to the left or to the right by the forces of the angular acceleration (depending upon the direction of the turn). The HMID 100 emulates that feeling of angular acceleration by generating forces that tend to move the head 301 to tilt to the side. Accordingly, the processor system 204, executing the mass rotation acceleration determination module 220, processes the apparent acceleration vector information to determine the amount of and duration of rotation acceleration of each of the rotational acceleration masses 102a-102d to generate a desired sideways tilting force on the user's head.

In this simplified example wherein the user's intent is for a turn only (angular acceleration), the second left side rotational acceleration mass 102c and the second right side rotational acceleration mass 102d will be accelerated at a determined rate of speed, a direction of rotation, and for a determined acceleration duration. Here, the direction of rotation will be the opposite of each other. The first left side rotational acceleration mass 102a and the first right side rotational acceleration mass 102b are not accelerated.

Once the amount, direction, and duration of acceleration are determined for the first left side rotational acceleration mass 102a, the processor system 204, executing the motor control module 222, processes the apparent acceleration vector information to determine a motor control signal that is communicated to the motor (motor 3 acceleration vector 2, or M3AV2) of the second left side rotational acceleration mass 102c, via the motor interface 216. Concurrently, the processor system 204 determines a motor control signal that is communicated to the motor (motor 4, acceleration vector 2', or M4AV2') of the second right side rotational acceleration mass 102d. (No signal, or a null signal, is communicated to the motors of the first left side rotational acceleration mass 102a and the first right side rotational acceleration mass 102b.) The user then feels the sensation of their head being urged to tilt sideways in response to the turning of their avatar 408.

Summarizing, in situations pertaining to consumption of interactive video content and where the user intends that their avatar 408 moves faster/slower, turns (right or left), and/or jumps (up or down), apparent motion and/or apparent acceleration information, interchangeably referred to herein as the apparent acceleration vector information, is determined from the user generated user intent information. Then, the HMID 100 process the received or determined apparent motion and/or apparent acceleration information to determine and then generate the motor control signals that cooperatively accelerate the masses in the rotational acceleration masses 102*a*-102*e*. Cooperatively, these rotational acceleration masses 102*a*-102*e* are operated to urge the user's head 302 to become tilted upward or backward, to become tilted to either side, or/or to be pushed downward or lifted upward. These counter-rotational reactive forces are generated in synchronism with the currently presenting visual content that is being consumed by the user so that the user experiences acceleration sensations that emulate acceleration in real life.

Figure 5:
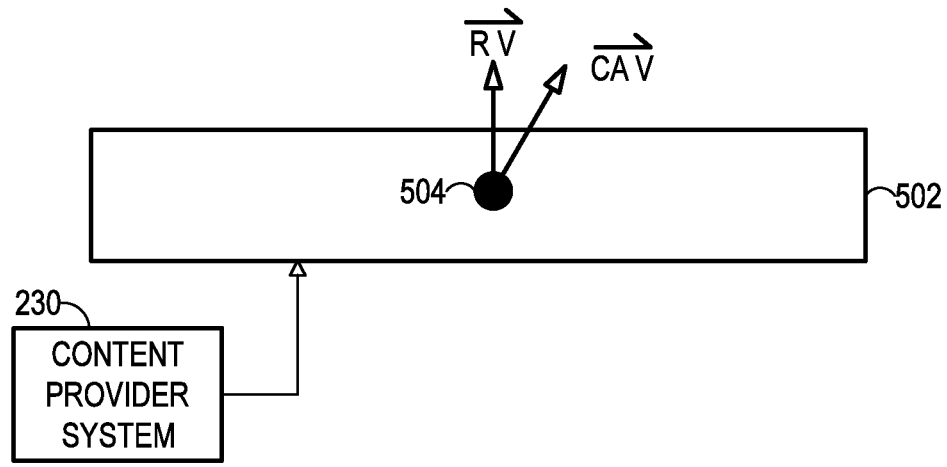
FIG. 5 is a conceptual diagram of the user consuming media content.
Figure 5:
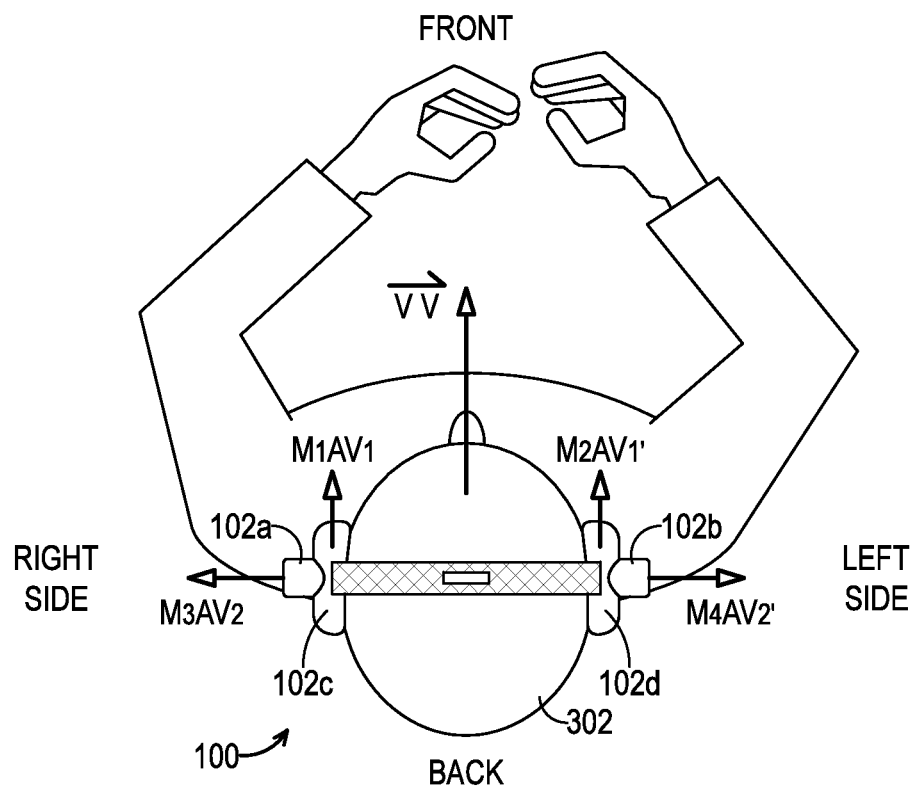

FIG. 5 is a conceptual diagram of the user consuming non-interactive media content (visual and audio content). The user views the visual content portion of the presenting media content on a display 502, a projection screen 502, a head mounted display 502, or the like. In the disclosed headphone 106 embodiment, the speakers 110 reproduce the audio content from the media content stream. In other embodiments, the audio content portion is reproduced by other speakers (not shown).

In this simplified hypothetical example, the user's head 302 is looking directly forward towards the display 502, as represented by the direction of the user's view vector (VV). The content provider predefines a directional reference vector (RV) that is associated with a hypothetical direction of view of the visual content. For example, but not limited to, the content provider may select a center of the visual image of the visual content and directed inward (normal to the plane of the display) as the reference vector RV. Any reference vector RV may be predefined.

At times, during presentation of the visual content, an object shown in the image being presented in the visual content may undergo an apparent acceleration so as to apparently move faster or slower (linear acceleration), move in a turning direction (angular acceleration), and/or move up or down (vertical acceleration). For example, the image of the visual portion may present a view from a seat in an aircraft that makes a sharp, sudden turn (an angular acceleration). The content provider may define a content acceleration vector, CAV, and associate the content acceleration vector CAV to coincide with the presentation of the turning image (coincide with the start time, duration, and end time of the sharp turn of the aircraft). The content acceleration vector CAV, interchangeably referred to herein as the apparent acceleration vector, is referenced to the predefined reference vector RV. The content acceleration vector CAV includes an angular magnitude corresponding to the amount of the turn, angular reference information (pitch, roll, and/or yaw), and a duration that the turn is being effected. Accordingly, an initial vector (such as the travel direction of the aircraft), turn direction information (pitch, roll, and/or yaw angles), and turn duration information allows determination of the final direction after completion of the turn. Additionally, the content acceleration vector CAV may include any velocity change information.

The content acceleration vector CAV information (apparent acceleration vector information) is communicated to the HMID 100 so that the feeling of acceleration can be emulated in synchronism with the currently presenting visual content. The content acceleration vector CAV may be communicated as a form of metadata information. One skilled in the art appreciates how to implement synchronization of content metadata with image presentation and content streams.

The metadata type information defining the content acceleration vector CAV is embedded into the content stream of the media content in a suitable location and format. The processor system 204, executing the content acceleration module 226, process the received content acceleration vector CAV into apparent motion and/or apparent acceleration information. Then, the processor system 204, executing the motor control module 222, determines motor control signals that are communicated to the motors of the rotational acceleration masses 102*a*-102*e*.

The motors of the rotational acceleration masses 102*a*-102*d* are then operated in a manner that coincides with the visual presentation of the acceleration of the image. Accordingly, the acceleration of the rotational acceleration masses 102*a*-102*d* generate counter-rotational reactive forces that emulate the apparent motion and/or apparent acceleration information so that the viewing user "feels" the acceleration of the object being presented on the display 502.

In the above hypothetical conceptual examples of FIGS. 4 and 5, it is presumed that the user's view vector VV is looking straight forward so as to coincide with the initial reference vector RV (or the initial avatar vector AV). Accordingly, linear accelerations in the forward or backward direction are induced by the rotational acceleration masses 102*a*-102*b*. Rotational type angular accelerations and/or vertical accelerations are induced by the rotational acceleration masses 102*c*-102*d*.

One skilled in the art appreciates that situations may arise when the user's head is turned to one side, upward, downward, and/or in another initial direction when consuming non-interactive or interactive visual content. In these situations, the user's initial view vector VV will not coincide with the initial reference vector RV (associated with non-interactive content) or the initial avatar vector AV (associated with interactive visual content) when the apparent motion and/or apparent acceleration occurs in the visual portion of the media content. Accordingly, the counter-rotational reactive forces that needs to be induced by the HMID 100 will be quite different than those counter-rotational reactive forces induced as described above.

Figure 6:
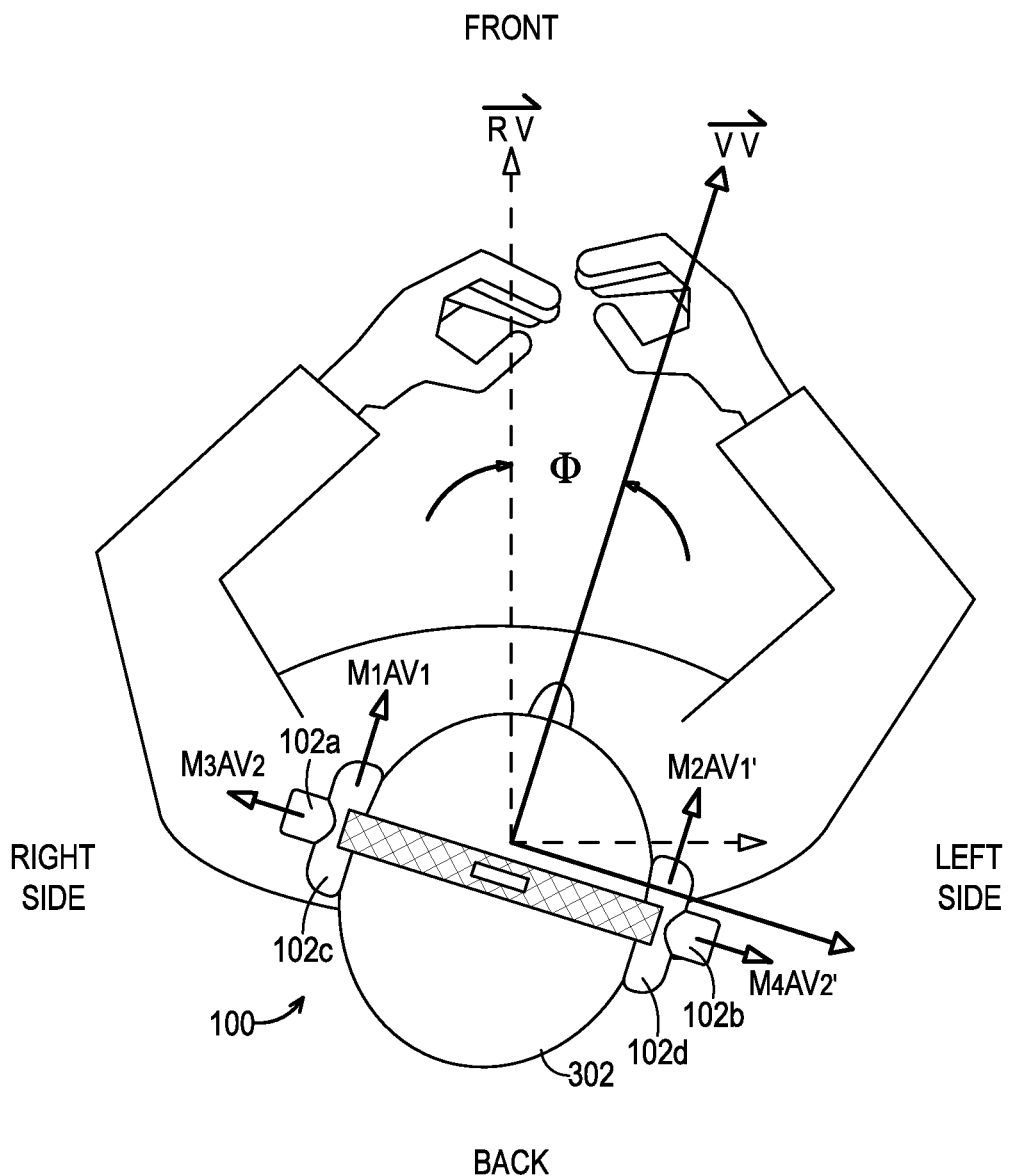
FIG. 6 is a conceptual image of a head of a viewer that is not initially aligned with the initial reference vector (RV).

FIG. 6 is a conceptual image of a head 302 of a viewer that is not initially aligned with the initial reference vector RV. In this FIG. 6, the user is looking to their right so that the initial user's view vector VV is offset from the initial reference vector RV by a view offset angle of Ø. For example, the user may be looking towards their left while the object in the presenting image is moving straight ahead prior to an acceleration of the object. In contrast, in the conceptual diagrams of FIGS. 4 and 5, the direction of the initial reference vector RV (not shown in FIG. 4 or 5) coincides with the direction of the initial user's view vector VV.

In such situations when the initial user's view vector VV is oriented differently from the initial reference vector RV, the determined apparent motion and/or apparent acceleration information must be translated and/or transformed by a transformation function $f(Ø)$ associated with the view offset angle Ø.

The various embodiments of the HMID 100 are configured to continuously track the position and/or orientation of the user's head 302 during consumption of the media content. In embodiments that include the MEMs system 208, the processor system 204, executing the head position determination module 218, determines the current head position and/or orientation of the user on a real time basis, or a near real time basis, using the information provided by the MEMs system 208. In embodiments that receive information from the remote motion sensor 236, the processor system 204, executing the head position determination module 218, determines the current head position and/or orientation of the user on a real time, or near real time, basis using the information provided by the remote motion sensor 236. Alternatively, the remote motion sensor 236 may determine the current head position and/or orientation, and provide that information to the HMID 100. Such position and/or orientation determination processes and devices are well understood in the arts, and are not explained in detail herein for brevity.

The determined apparent motion and/or apparent acceleration information may be represented as an apparent acceleration vector, VA. The information in the apparent acceleration vector VA is then processed by the processor system 204, executing the motor control module 222, to generate the motor control signals that accelerate the rotational acceleration masses 102a-102e. In one example implementation, the apparent acceleration vector VA may be constructed as a vector matrix that includes the following information:

1. Direction of current apparent movement component
2. Velocity of current apparent movement component
3. Magnitude of apparent linear acceleration component
4. Duration of apparent linear acceleration component
5. Magnitude of apparent angular acceleration component
6. Angle of apparent angular acceleration (pitch, roll, yaw)
7. Duration of apparent angular acceleration component As described herein when the user is consuming interactive media content (see FIG. 4), the apparent acceleration vector VA is based on the user's intent information that is input via a content system user controller 232. If the user is consuming non-interactive media content, then the apparent acceleration vector VA is based on the content acceleration vector CAV information provided by the content provider system 230. If at the time that the counter-rotational reactive forces are to be applied to the headphone 106 to urge the user's head in a particular direction to emulate the apparent motion and/or apparent acceleration presented in the visual content, and if at that time the initial user's view vector VV is different from the initial reference vector RV, then the apparent acceleration vector VA mut be translated or transformed to account for the view offset angle Ø. Here, equation (1) describes the offset apparent acceleration vector VA'.

$$VA' = (VA)f(\emptyset) \quad (1)$$

The offset apparent acceleration vector VA' may be viewed as a vector matrix that includes the following information:

1. Offset direction of apparent movement component
2. Offset velocity of apparent movement component
3. Offset magnitude of apparent linear acceleration component
4. Duration of apparent linear acceleration component
5. Offset magnitude of apparent angular acceleration component
6. Offset angle of apparent angular acceleration (pitch, roll, yaw)
7. Duration of apparent angular acceleration component Once offset apparent acceleration vector VA' is determined, by the processor system 204 executing the mass rotation acceleration determination module 220, then the processor system 204 may determine and generate the motor control signals for the rotational acceleration masses 102a-102e (FIGS. 1 and 2).

For example, if the user is looking straight ahead such that the initial user's view vector VV is the same as the initial reference vector RV (see for example, FIGS. 4 and 5), and if the visual content is currently presenting a forward acceleration, then the rotational acceleration masses 102a and 102b are accelerated to urge the user's head 302 backward to emulate the apparent acceleration. However, if the user's head is turned towards their right (see for example, FIG. 6), then one skilled in the art appreciates that the counter-rotational reactive forces imparted by the rotational acceleration masses 102a-102e should concurrently urge the user's head 302 both backward and sideways. Here, the processor system 204, determines the acceleration that is to be applied by each of the rotational acceleration masses 102a-102e based on the determined offset apparent acceleration vector VA'.

Figure 7:
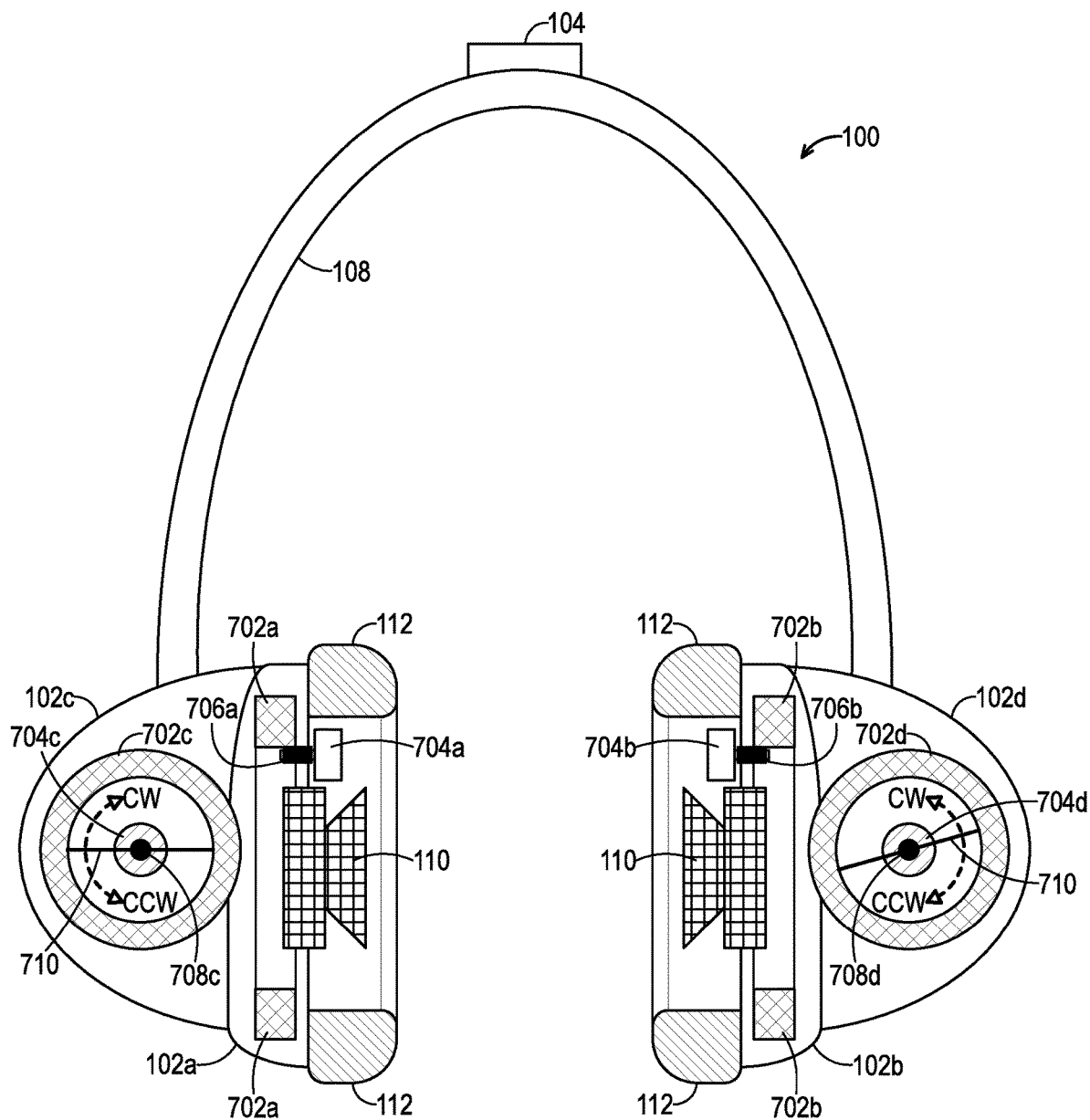
FIG. 7 is a cross sectional view of an embodiment of the HMID.

FIG. 7 is a cross sectional view of an embodiment of the HMID 100. In contrast to FIG. 1, the second left side rotational acceleration mass 102c and the second right side rotational acceleration mass 102d have different locations on the frame 108. However, the second left side rotational acceleration mass 102c and the second right side rotational acceleration mass 102d are oriented the same as illustrated in FIG. 1 and as described herein.

The first left side rotational acceleration mass 102a and the first right side rotational acceleration mass 102b, in this nonlimiting example embodiment, include a rotational acceleration mass 702a and 702b, respectively. Similarly, the second left side rotational acceleration mass 102c and the second right side rotational acceleration mass 102d, in this nonlimiting example embodiment, include a rotational acceleration mass 702c and 702d, respectively. Preferably, the rotational acceleration masses 702a and 702b are similarly sized in dimension and weight, and the rotational acceleration masses 702c and 702d are similarly sized in dimension and weight. In some embodiments, the rotational acceleration masses 702a, 702b are sized differently in dimension and/and weight than the rotational acceleration masses 702c and 702d.

In the various embodiments, the rotational acceleration masses 702a-702d may be made of a suitable dense material, such as metal, stone, or the like, though any material having mass characteristics that will impart an urging motion to the user's head 301 (FIG. 3) may be used in the various embodiments. Preferably, the centroid of the rotational acceleration masses 702a-702c is located at the center axis of the rotational acceleration masses 102a-102d. Preferably, but not required, a center portion about the axis of each rotational acceleration mass 102a-102e is void of material. In other words, the rotational acceleration masses 102a-102e may be considered as rings with a predefined mass and predefined dimensions such that, when accelerated at a predefined magnitude for a predefined duration, the generated counter-rotational reactive force is determinable.

The rotational acceleration masses 702a-702d are each driven by a motor 704a-704d, respectively. The motors 704a-704d are controllably coupled to the HMID control 104, via the motor interface, using any suitable wire-based or wireless communication format. (One skilled in the art appreciates that transceivers, not shown, are required for wireless communications.) That is, the HMID 100 operates each of the motors to drive a rotational acceleration of the rotational acceleration masses 102a-102e based on the determined accelerations.

In the example embodiment, the rotational acceleration masses 702a and 702b are driven by a motor 704a, 704b, respectively. Since there is no material in the center of the rotational acceleration masses 702a and 702b, the rotational acceleration masses 102a and 102b may be located around the outside of the speakers 110, thereby permitting a more compact and ergonomic structure of the HMID 100. The motors 704a, 704b are, in this embodiment, coupled to the rotational acceleration masses 702a and 702b by a frictional roller may of a material that will frictionally engage the inner surface of the rotational acceleration masses 702a and 702b. Other embodiments may use gears. teeth, etc. to engage the motors 704a, 704b with the rotational acceleration masses 702a and 702b, respectively.

In the example embodiment, the rotational acceleration masses 702c and 702d are driven by a motor 704c, 704d, respectively. In this example embodiment, the rotational acceleration masses 702c and 702d are coupled to a motor shaft 708c, 708d at the center of the rotational acceleration masses 702a and 702b via a plurality of spokes 710 or the like.

Figure 8:
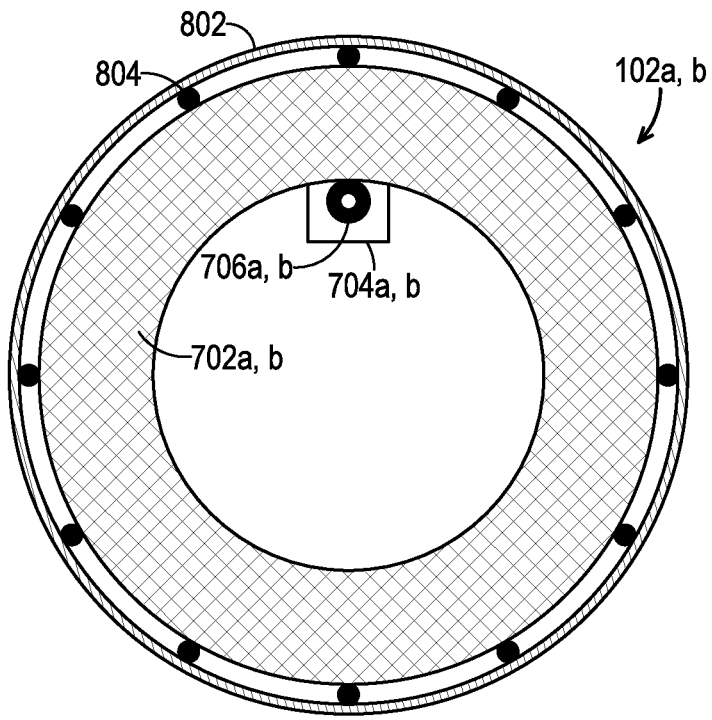
FIG. 8 is an expanded view of the rotational acceleration masses.

FIG. 8 is an expanded view of the rotational acceleration masses 102a, 102b. Here, the rotational acceleration masses 702a and 702b are secured within a frame 804. A plurality of roller bearings are located between the frame 804 and the rotational acceleration masses 702a and 702b. Accordingly, the rotational acceleration masses 702a and 702b are secured in place while still being able to freely rotate.

Figure 9:
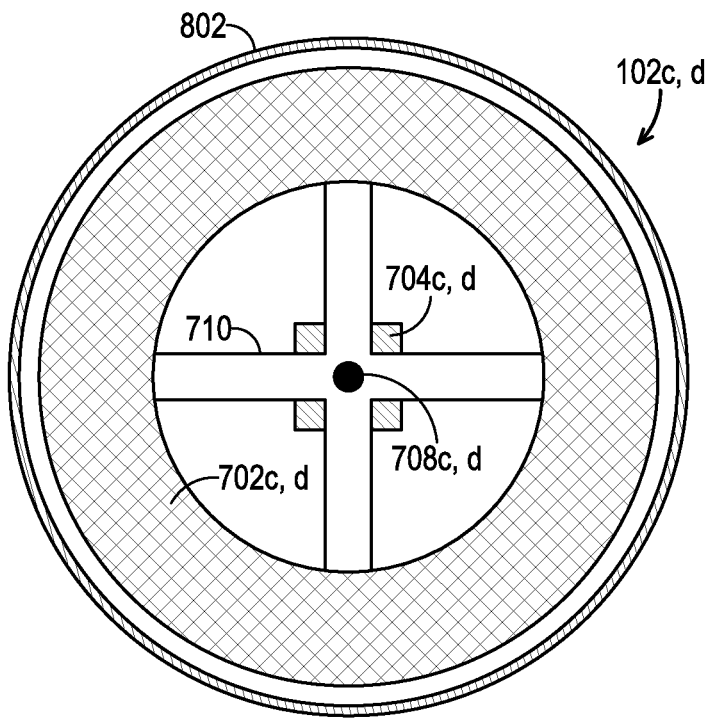
FIG. 9 is an expanded view of the rotational acceleration masses.

FIG. 9 is an expanded view of the rotational acceleration masses 102c, 102d. Here, the rotational acceleration masses 702c and 702d are secured to the motor shafts 708c, 708d, respectively, via a plurality of spokes 710. Here, the motors 704c, 704d are coupled to and secured to the frame 804. Accordingly, the rotational acceleration masses 702a and 702b are secured in place while still being able to freely rotate.

Figure 10:
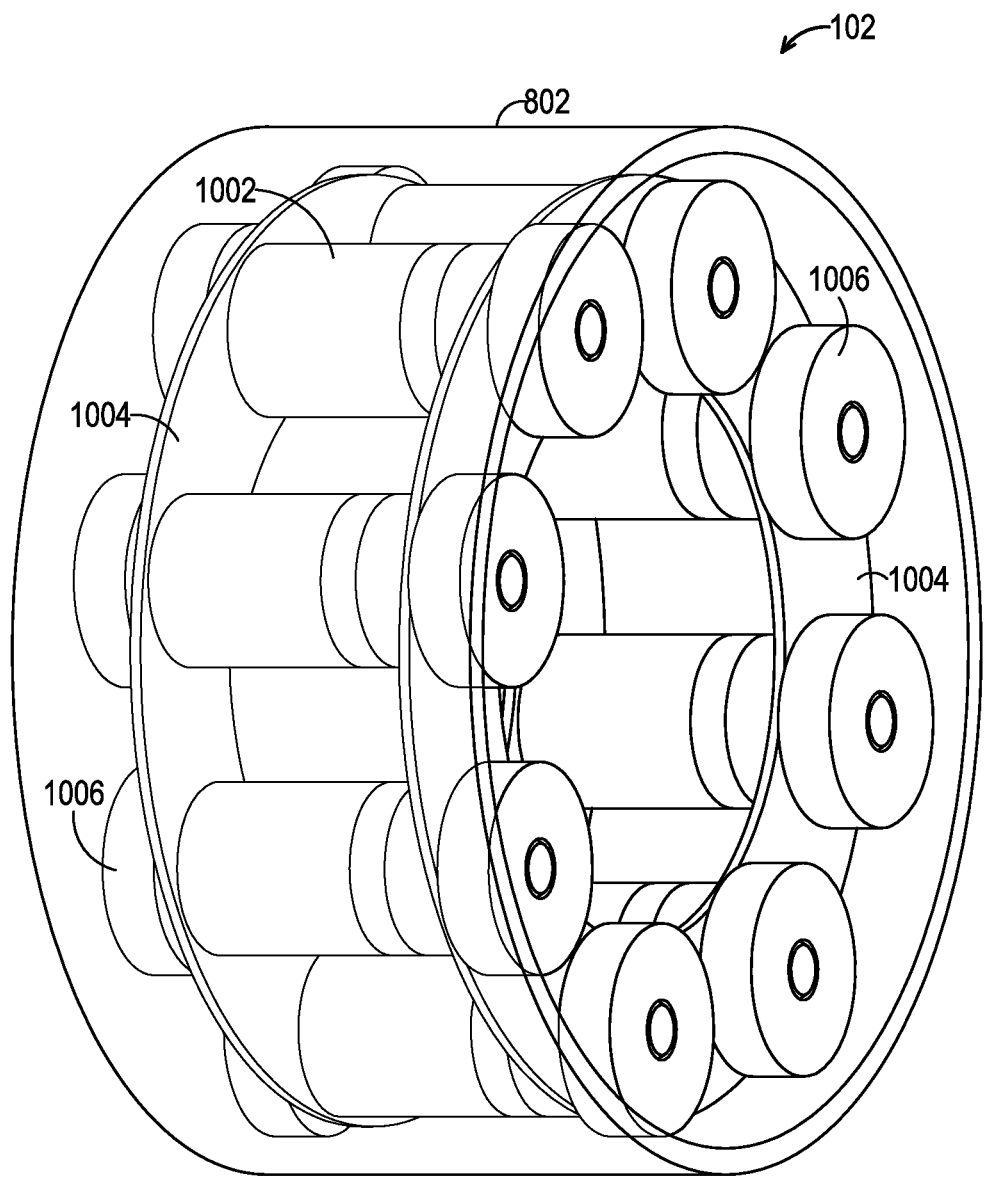
FIG. 10 is a partially transparent perspective view a rotational acceleration mass that employs a plurality of batteries.

FIG. 10 is a partially transparent perspective view a rotational acceleration mass that employs a plurality of batteries 1002. The batteries 1002 provide the dual function of acting as a rotational acceleration mass 702 for the rotational acceleration masses 102a-102e, and as a power source for the motor 704a-704e. In a preferred embodiment, the batteries 1002 are rechargeable. In other embodiments, the batteries 1002 are replaceable with fully charged replacement batteries. The batteries 1002 may be of any size, power, voltage and/or dimension, but preferably are standardized with other types or readily available commercial batteries. Any suitable motor 704 may be powered by the batteries 1002 to accelerate the mass.

In a nonlimiting example embodiment, the batteries 1002 are securely retained in place using one or more battery retainer racks 1004. The rack 1004 is secured to, or is an integrated component of, the frame 802. The batteries 1002 may be secured to the rack 1004 using any suitable securing means, such as a snap or a screw cap 1006, snap devices, adhesive, screws, or the like.

It should be emphasized that the above-described embodiments of the HMID 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A method of inducing head motion onto a frame of a head motion inducing device, wherein the frame is secured to the head of a user, wherein the head motion inducing device includes at least a controller, a first rotational acceleration mass driven by a first motor, and a second rotational acceleration mass driven by a second motor, the method comprising:
   receiving apparent acceleration vector information from a content presentation system, wherein the apparent acceleration vector information corresponds to at least one of an apparent motion and an apparent acceleration of an object shown in visual media content that is presented on a display being viewed by the user;
   determining a first acceleration of the first rotational acceleration mass based on the received apparent acceleration vector information;
   determining a second acceleration of the second rotational acceleration mass based on the received apparent acceleration vector information; and
   concurrently operating the first motor to drive a first rotational acceleration of the first rotational acceleration mass based on the determined first acceleration and operating the second motor to drive a second rotational acceleration of the second rotational acceleration mass based on the determined second acceleration,
   wherein the rotational acceleration of the first rotational acceleration mass and the second rotational acceleration mass cooperatively induce a counter-rotational reactive force on the frame that urges the head of the user, and
   wherein the counter-rotational reactive force emulates at least one of an apparent movement and an apparent acceleration of the object that is currently being presented on the display.

2. The method of claim 1,
   wherein the first rotational acceleration mass and the second rotational acceleration mass are oriented parallel to a plane that is defined by a forward direction vector and an up direction vector.

3. The method of claim 1,
   wherein the first rotational acceleration mass and the second rotational acceleration mass are oriented parallel to a plane that is defined by a left direction vector and an up direction vector.

4. The method of claim 1,
   wherein the first rotational acceleration mass is secured to the frame at a first location on the frame that corresponds to a left side of the head of the user, and wherein the second rotational acceleration mass is secured to the frame at a second location on the frame that corresponds to a right side of the head of the user.

5. The method of claim 1, wherein the head motion inducing system further includes a third rotational acceleration mass driven by a third motor and a fourth rotational acceleration mass driven by a fourth motor, the method further comprising:
   determining a third acceleration of the third rotational acceleration mass based on the received apparent acceleration vector information;
   determining a fourth acceleration of the fourth rotational acceleration mass based on the received apparent acceleration vector information;
   operating the third motor to drive a third rotational acceleration of the third rotational acceleration mass based on the determined third acceleration; and
   operating the fourth motor to drive a fourth rotational acceleration of the fourth rotational acceleration mass based on the determined fourth acceleration,
   wherein the rotational acceleration of the first rotational acceleration mass, the second rotational acceleration mass, the third rotational acceleration mass and the fourth rotational acceleration mass cooperatively induces the counter-rotational reactive force that urges the head of the user.

6. The method of claim 5, further
   wherein the first rotational acceleration mass and the second rotational acceleration mass are oriented parallel to a plane that is defined by a forward direction vector and an up direction vector, and
   wherein the third rotational acceleration mass and the fourth rotational acceleration mass are oriented parallel to a plane that is defined by a left direction vector and an up direction vector.

7. The method of claim 5,
   wherein the first rotational acceleration mass and the third first rotational acceleration mass secured to the frame at a first location on the frame that corresponds to a left side of the head of the user, and
   wherein the second rotational acceleration mass and the fourth rotational acceleration mass are secured to the frame at a second location on the frame that corresponds to a right side of the head of the user.

8. The method of claim 1,
   wherein the media content is non-interactive media content, and
   wherein the apparent acceleration vector information is predefined by the content presentation system based on a predefined directional reference vector (RV) that is associated with a hypothetical direction of view of the media content.

9. The method of claim 8, further comprising:
   determining a current direction of a user's view vector (VV), wherein the direction of the user's view vector (VV) corresponds to a direction of the user's view;
   determining an offset angle between the current direction of the user's view vector (VV) and the predefined directional reference vector (RV) that is associated with the hypothetical direction of view of the media content; and
   translating the received apparent acceleration vector information into offset apparent acceleration vector information based on the determined offset angle,
   wherein the determined first acceleration of the first rotational acceleration mass is based on the offset apparent acceleration vector information, and
   wherein the determined second acceleration of the second rotational acceleration mass is based on the offset apparent acceleration vector information.

10. The method of claim 1,
    wherein the media content is interactive media content that is currently presenting an avatar on the display, and
    wherein the media content provider receives user intent information that is input by the user via a content system user controller, and
    wherein the apparent acceleration vector information is determined by the content presentation system based on the user intent information.

11. The method of claim 10, further comprising:
    wherein the apparent acceleration vector information includes a direction of an initial avatar vector (AV), wherein the direction of the initial avatar vector (AV) corresponds to an initial direction of the user's view;
    determining an offset angle between the direction of the user's view vector (VV) and the initial avatar vector (AV); and
    translating the received apparent acceleration vector information into offset apparent acceleration vector information based on the determined offset angle,
    wherein the determined first acceleration of the first rotational acceleration mass is based on the offset apparent acceleration vector information, and
    wherein the determined second acceleration of the second rotational acceleration mass is based on the offset apparent acceleration vector information.

12. The method of claim 1, wherein the media content is interactive media content that is currently presenting an avatar on the display, wherein the content presentation system includes a content system user controller that is communicatively coupled to the controller of the head motion inducing system, the method further comprising:
    receiving user intent information that is input by the user via the content system user controller,
    wherein the apparent acceleration vector information is determined by the controller based on the user intent information.

13. The method of claim 12, further comprising:
    determining a direction of an initial avatar vector (AV), wherein the direction of the initial avatar vector AV corresponds to a direction of the user's view;
    determining an offset angle between the direction of the user's view vector (VV) and the predefined directional reference vector (RV) that is associated with the hypothetical direction of view of the media content; and
    translating the received apparent acceleration vector information into offset apparent acceleration vector information based on the determined offset angle,
    wherein the determined first acceleration of the first rotational acceleration mass is based on the offset apparent acceleration vector information, and
    wherein the determined second acceleration of the second rotational acceleration mass is based on the offset apparent acceleration vector information.

14. The method of claim 1, wherein the apparent acceleration vector information corresponds to a linear acceleration in a forward direction, the method further comprising:
    concurrently operating the first motor and the second motor in a clockwise direction,
    wherein the head of the user is urged backwards.

15. The method of claim 1, wherein the apparent acceleration vector information corresponds to an angular acceleration corresponding to an apparent turn, the method further comprising:

concurrently operating the first motor in a counter clockwise direction and the second motor in a clockwise direction,
wherein the head of the user is urged sideways.

16. The method of claim 1, wherein the apparent acceleration vector information corresponds to a linear acceleration in a forward direction, the method further comprising:
concurrently operating the first motor and the second motor in a clockwise direction,
wherein the head of the user is urged downward.

17. A head motion inducing system, comprising:
a frame configured to be secured to a head of a user;
a first left side rotational acceleration mass secured to the frame at a first location on the frame that corresponds to a left side of the head of the user, wherein the first left side rotational acceleration mass is oriented parallel to a first plane that is defined by a forward direction vector and an up direction vector, and wherein the first left side rotational acceleration mass comprises:
a first rotational acceleration mass; and
a first motor,
wherein response to actuating the first motor, the first rotatable mass is rotatably accelerated to generate a first counter-rotational reactive force that is exerted on the frame;
a first right side rotational acceleration mass secured to the frame at a second location on the frame that corresponds to a right side of the head of the user, wherein the first right side rotational acceleration mass is oriented parallel to the first plane that is defined by the forward direction vector and the up direction vector, and wherein the first left side rotational acceleration mass comprises:
a second rotational acceleration mass; and
a second motor,
wherein response to actuating the second motor, the second rotational acceleration mass is rotatably accelerated to generate a second counter-rotational reactive force that is exerted on the frame;
a second left side rotational acceleration mass secured to the frame at a third location on the frame that corresponds to the left side of the head of the user, wherein the second left side rotational acceleration mass is oriented parallel to a second plane that is defined by a left direction vector and the up direction vector, and wherein the first left side rotational acceleration mass comprises:
a third rotational acceleration mass: and
a third motor,
wherein response to actuating the third motor, the first rotational acceleration mass is rotatably accelerated to generate a third counter-rotational reactive force that is exerted on the frame;
a second right side rotational acceleration mass secured to the frame at a location on the frame that corresponds to the right side of the head of the user, wherein the second right side rotational acceleration mass is oriented parallel to the second plane that is defined by the left direction vector and the up direction vector, and wherein the first left side rotational acceleration mass comprises:
a fourth rotational acceleration mass: and
a fourth motor,
wherein response to actuating the fourth motor, the fourth rotational acceleration mass is rotatably accelerated to generate a fourth counter-rotational reactive force that is exerted on the frame;
a content system interface that is communicatively coupled to a content presentation system that communicates information corresponding to an apparent acceleration vector; and
a processor system that processes the received apparent acceleration vector information, wherein the processor system determines:
a first rotational acceleration of the first rotational acceleration mass based on the received apparent acceleration vector information;
a second rotational acceleration of the second rotational acceleration mass based on the received apparent acceleration vector information;
a third rotational acceleration of the third rotational acceleration mass based on the received apparent acceleration vector information; and
a fourth rotational acceleration of the fourth rotational acceleration mass based on the received apparent acceleration vector information,
wherein the acceleration of the first rotational acceleration mass that generates the first counter-rotational reactive force that is exerted on the frame, the acceleration of the second rotational acceleration mass that generates the second counter-rotational reactive force that is exerted on the frame, the acceleration of the third rotational acceleration mass that generates the third counter-rotational reactive force that is exerted on the frame, and the acceleration of the fourth rotational acceleration mass that generates the fourth counter-rotational reactive force that is exerted on the frame cooperatively generate a total counter-rotational reactive force that emulates at least one of an apparent movement and an apparent acceleration of an object that is presented on a display.

18. The head motion inducing system of claim 17, further comprising:
a motor interface that communicatively couples the processor system to the first motor, the second motor, the third motor and the fourth motor,
wherein in response to determining the first rotational acceleration of the first rotational acceleration mass based on the received apparent acceleration vector information, the processor system generates a first motor control signal that is communicated via the motor interface to the first motor, and
wherein the first motor operates to accelerate the first rotational acceleration mass to generate the first counter-rotational reactive force in response to receiving the first motor control signal.

19. The head motion inducing system of claim 18,
wherein in response to determining the second rotational acceleration of the first rotational acceleration mass based on the received apparent acceleration vector information, the processor system generates a second motor control signal that is communicated via the motor interface to the second motor,
wherein the second motor operates to accelerate the second rotational acceleration mass to generate the second counter-rotational reactive force in response to receiving the second motor control signal,
wherein in response to determining the third rotational acceleration of the third rotational acceleration mass based on the received apparent acceleration vector information, the processor system generates a third motor control signal that is communicated via the motor interface to the third motor, wherein the third motor operates to accelerate the third rotational acceleration mass to generate the third counter-rotational reactive force in response to receiving the third motor control signal, and wherein in response to determining the fourth rotational acceleration of the fourth rotational acceleration mass based on the received apparent acceleration vector information, the processor system generates a fourth motor control signal that is communicated via the motor interface to the fourth motor, and wherein the fourth motor operates to accelerate the fourth rotational acceleration mass to generate the fourth counter-rotational reactive force in response to receiving the fourth motor control signal.

\* \* \* \* \*